3,483,292
COMPOSITION FOR THE TREATMENT AND/OR
 PREVENTION OF COCCIDIOSIS IN POULTRY
Toshio Ishii, Tokyo, Yasuto Takamatsu, Kokubunji-shi,
 Tokyo, Shojiro Yurigi, Kyoto, and Katsutada Masuda,
 Ashiya, Japan, assignors to Takeda Chemical Industries, Ltd., Higashi-ku, Osaka, Japan
No Drawing. Filed Mar. 10, 1967, Ser. No. 622,068
Claims priority, application Japan, Mar. 11, 1966,
41/15,172
Int. Cl. A61k 27/00
U.S. Cl. 424—251                                    18 Claims

ABSTRACT OF THE DISCLOSURE

Anti-coccidiosis activity of compounds of the formula

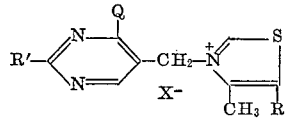

wherein Q is —$NH_2$ or —$NH_3^+X'^-$, each of R and R' is a lower alkyl group with from 1 to 3 carbon atoms, and each of $X^-$ and $X'^-$ is an inorganic acid anion, is remarkably increased by the coemployment therewith of free terephthalic acid or terephthalic acid mono- or di-ester or of salt of the said acid or mono-ester.

---

The present invention relates to compositions for the treatment and/or prevention of coccidiosis in poultry, and to methods for the treatment and/or prevention of coccidiosis in poultry.

Coccidiosis is an infectious fatal poultry disease and the treatment and prevention of the disease constitute one of the most important problems in the poultry industry.

Attempts have heretofore been made to treat the disease by means of various anti-coccidial agents such as arsenic compounds, nitrofurazone, bisphenol, sulfa drugs, pyrimidinyl methyl imidazolium salts, and pyrimidinyl-methyl pyridinium salts. These known anti-coccidial drugs, however, have such defects as weak activity or otherwise, strong and unfavorable side-effects.

We have previously found that thiazolium quaternary salts of the formula

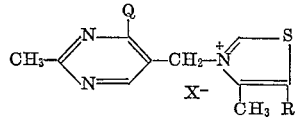

wherein Q is —$NH_2$ or —$NH_3^+X'^-$, R is a "lower alkyl" group with from 1 to 3 carbon atoms, and each of $X'^-$ and $X^-$ is an inorganic acid anion, have a remarkable preventative and curative action against coccidiosis and do not show any unfavorable side-effects upon the growth of the poultry after treatment.

The present invention represents a further improvement on this kind of anti-coccidial agent according to which the anti-coccidial action of the thiazolium salts of the formula

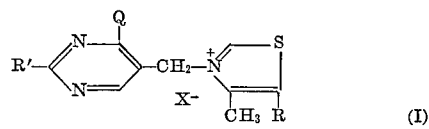

wherein each of R and R' is lower alkyl with from 1 to 3 carbon atoms, and Q, $X'^-$ and $X^-$ have the previously recited significances, is remarkably increased by the co-employment therewith of free terephthalic acid or certain terephthalic acid derivatives, as hereinafter defined.

That is to say, the present invention provides compositions for the treatment and/or prevention of coccidiosis in poultry, which substantially consist of admixtures of carrier and/or diluent and thiazolium salt of the above-mentioned Formula I and terephthalic acid or terephthalic acid derivative, the concentration of the thiazolium salt in the composition being from 0.001% to about 0.05% by weight and the concentration of the terephthalic acid or derivatives thereof being from about 0.1% to about 0.5% by weight. It also provides a method of treating and/or preventing coccidiosis in poultry, in which an anti-coccidial amount of the thiazolium salt of the above-mentioned Formula I and terephthalic acid or derivative thereof are administered to poultry.

In Formula I, each of R and R' is methyl, ethyl, propyl or isopropyl, $X'^-$ and $X^-$ stands for the same or different (advantageously the same) inorganic acid anions, e.g. $Cl^-$, $Br^-$, $I^-$, $NO_3^-$, $NO_2^-$, $(SO_4^{--})\frac{1}{2}$, $ClO_4^-$, $SCN^-$, etc.

Typical thiazolium quaternary salts (I) constituting the active anti-coccidial agents in the compositions of the invention comprise, for example:

3-(2-methyl-4-amino-pyrimidin-5-yl-methyl)-4,5-di-
  methylthiazolium salt;
3-(2-methyl-4-amino-pyrimidin-5-yl-methyl)-4-methyl-
  5-ethylthiazolium salt;
3-(2-methyl-4-amino-pyrimidin-5-yl-methyl)-4-methyl-
  5-propylthiazolium salt, and
3-(2-ethyl-4-aminopyrimidin-5-yl-methyl)-4,5-dimethyl-
  thiazolium salt, ("salt" referring to the chloride, bromide, iodide, nitrate, nitrite, sulfate, perchlorate, thiocyanate, etc. mono- or di-salt).

A compound of Formula I can be prepared e.g. by reacting a compound of formula

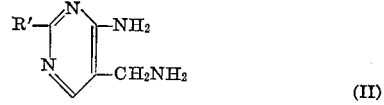

with carbon disulfide and 3-halo-alkan-2-one, e.g. 3-chloro-butan-2-one, in the presence of a basic compound such as aqueous ammonia, alkali metal hydroxide or alkali metal carbonate to give 3-(2-lower alkyl-4-amino-pyrimidin-5-yl-methyl)-4-hydroxy-4-methyl-5-lower alkyl thiazolidine-2-thione of formula

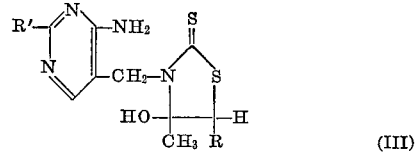

wherein R and R' are as precedingly defined, subjecting the compound of Formula III to a treatment with an inorganic acid such as hydrochloric acid, sulfuric acid and nitric acid or an organic acid such as acetic acid and formic acid and then treating the resultant product with an oxidizing agent such as hydrogen peroxide, bromine, potassium permanganate, potassium hypochlorite, etc.

Terephthalic acid derivatives to be employed in the present invention comprise terephthalic acid mono- or di-lower alkyl esters, "alkyl" containing 1 to 4 carbon atoms (e.g. monomethyl ester, monoethyl ester, dimethyl ester, diethyl ester, dipropyl ester and dibutyl ester), pharmaceutically acceptable terephthalic acid mono- or di-salts (e.g. mono-sodium salt, mono-potassium salt, di-sodium salt and dipotassium salt), and pharmaceutically acceptable mono-salts of the mono-esters. The salts with X and X', as previously enumerated, are pharmaceutically acceptable for administration to poultry.

The use of free terephthalic acid is most advantageous.

A composition according to the present invention comprises a thiazolium quaternary salt of Formula I and terephthalic acid or derivative thereof, as above-defined, as active anti-coccidial ingredients dispersed in, or admixed with, a suitable carrier or diluent. The compositions can be administered in such forms as powders, granules, tablets, suspension, emulsion or injection or advantageously are administered in admixture with poultry diet or in solution in drinking water for the poultry depending on various conditions such as the kind of poultry, the state of the poultry or the age of the poultry. As carrier or diluent, it is preferred to use one which is not reactive with the active ingredients, thiazolium salts (I) and terephthalic acid or derivative thereof, and which can be administered with safety to poultry. Carriers or diluents suitable in the present compositions include, for example, wheat shorts, wheat flour, corn meal, soybean mill feed, soybean flour, vegetables, ground shells, fish meal, soybean grits, dried grains, fermentation residues, rice-bran, potato starch, lactose, sucrose, glucose, fructose, molasses solubles, antibiotic-containing mycelia, vitamins, crushed limestone, clay, etc.

The optimum concentration of the present composition depends to some extent on the kind of thiazolium salt employed, the kind of poultry or the purpose of the administration of the composition, that is prevention or curing. A composition of any desired concentration may be prepared by selecting proper diluents and by determining the proper ratio of carrier to active ingredients. In general, compositions containing from about 0.001% to about 0.05% by weight, preferably from about 0.005% to about 0.025% by weight of thiazolium salt (I) and containing about from 0.1% to about 0.5%, preferably from about 0.2% to 0.3%, by weight of terephthalic acid or derivative thereof in various poultry diets or water are suitable for the treatment and the prevention of the disease. When the thiazolium salts (I) are employed as therapeutic agents, a higher concentration (about 0.0125 to 0.05%) is preferably used and when the thiazolium salts (I) are employed as preventive agents, a lower concentration 0.003%–0.0125% is preferably used.

Intermediate formulations of a certain concentration are preferably prepared in advance by using suitable diluents or carriers, and added to the finished feed in administration to poultry in the required proportions. About 1% to 30% by weight of the active ingredients is convenient as the concentration of the intermediate formulations.

The following illustrative experiments are given for a better understanding of the invention.

| | Test compound, percent | TPA, percent |
|---|---|---|
| Test compound group: | | |
| A | 0.0063 | |
| B | 0.0063 | 0.5 |

(5) *Method of test:* Above-mentioned chicks are raised isolatedly for at least 7 days and the condition of their health observed. They are weighed and divided into four groups consisting of five chicks each. The mean weight of each group is arranged to be equal. Two of the groups are test groups and the remainder are control groups. The chicks in the test groups are fed the diet containing the composition according to this invention and the control groups are fed the normal poultry diet. After 24 hours, each chick except non-infectious group is inoculated orally with 180,000 oocyst of Eimeria tenella.

(6) *Observations:* Mortality and bloody droppings in each group are recorded daily until the end of the test. Eight days after oocyst inoculation, all the survivors are sacrificed and examined pathologically.

(7) *Explanation of findings set forth in the table:*

Increasing rate of body weight $$= \left(\frac{\text{Average body weight at the Finish}}{\text{Average body weight at the Start}} - 1\right) \times 100$$

Rate of increasing rate of body weight=

$$\frac{\text{Increasing rate of body weight of test group}}{\text{Increasing rate of body weight of control group}} \times 100$$

*Bloody droppings:* Average drops of blood excreted from the intestine of each chick belonging to a group are shown according to the results of observation.

*Severity of caecal lesions* (shown by the following symbols according to the results of observation):

- —   Normal, no lesions
- ±   Trace
- +   Slight; less than 10 blood pin-point
- ++   Moderate; lesions marked, but not extreme
- +++   Severe; caeca greatly distended with blood or caseous core, caecal wall uniformly very thick.

*Oocyst output (O.P.G.):* Number of oocysts in 1 gram of caecal contents.

*Rate of sporulation:* To the caecal contents, 2% aqueous solution of potassium bichromate, the volume being 10 times as much as the contents, is added. Then the contents are incubated at 28° C. for 3 days, and the percentage of the sporulated oocysts to the all in the content is calculated.

*Result:* The result is shown in the table.

TABLE

| Percent by weight (of compound in diet) | Average body weight at start | Increasing rate of body weight, percent | Rate of increasing rate of body weight, percent | Mortality | Blood droppings after— 4 days | 5 days | 6 days | 7 days | Severity of caeca lesions (percent) +++ | ++ | + | ± | − | Oocyst output ×10⁴ | Rate of sporulation, percent |
|---|---|---|---|---|---|---|---|---|---|---|---|---|---|---|---|
| Test group: | | | | | | | | | | | | | | | |
| A (Test cpd., 0.0063%) | 54.4 | 150.0 | 110.0 | 0/5 | | 0.4 | 0.6 | | | | 7/10 | 3/10 | | 80 | 12.5 |
| B (Test cpd., 0.0063% plus TPA, 0.5%) | 54.4 | 151.0 | 110.8 | 0/5 | | | | | | | 2/10 | 8/10 | | <10 | 0 |
| Control group: | | | | | | | | | | | | | | | |
| I (Infectious control) | 54.4 | 104.8 | 76.8 | 7/15 | 1.8 | ∞ | 1.7 | | | 14/16 | 2/16 | | | 500 | 82.0 |
| II (Noninfectious control) | 54.4 | 136.4 | 100.0 | 0/5 | | | | | | | | | 10/10 | 0 | 0 |

TEST RUN 1

Test procedures (1) *Chicks:* Nine-day-old white leghorn males.

(2) *Oocyst:* Sporulated oocysts of Eimeria tenella.

(3) *Administered compounds:* 3 - (2 - methyl - 4 - aminopyrimidin - 5 - yl - methyl) - 4,5 - dimethylthiazolium chloride hydrochloride (test compound) and terephthalic acid (TPA).

(4) *Mixture rate:* The run is carried out by employing starter feeds A and B respectively containing test compound and/or TPA as follows:

As shown in the table, the anti-coccidial action of the 3 - (2 - methyl - 4 - aminopyrimidin - 5 - yl - methyl) - 4,5 - dimethylthiazolium salt is increased by the coemployment of terephthalic acid therewith. Similiar enhancement is achieved also with the other thiazolium salts.

In the following illustrative examples, "part" or "parts" are shown on a weight basis, unless otherwise specified. Parts by weight bear the same relation to parts by volume as do grams to milliliters.

EXAMPLE 1

Preparation of active ingredient 7.5 parts of 2-methyl-4-amino-5-aminomethylpyridine is dissolved in 40 parts by volume of 80% methanol. To the solution, there are added 3.4 parts of 28% aqueous ammonia, 4.2 parts of carbon disulfide and then 8.1 parts of 3-chlorobutan-2-one, and the mixture is agitated for 4 hours at 50° C., reaction taking place. After the reaction, the methanol is distilled off under reduced pressure and to the residue is added 7.2 parts of concentrated hydrochloric acid, followed by heating at 70° C. for 1 hour. After cooling, an aqueous solution of sodium hydroxide is added to the solution and the pH value is adjusted to 7, solid substance being thrown down. The solid substance is separated by filtration, washed with water and dried to give 13 parts of 3-(2-methyl-4-aminopyrimidin-5-yl-methyl)-4,5-dimethylthiazole-2-thione melting at 223° C. Yield 90%.

10 parts of 3-(2-methyl-4-aminopyrimidin-5-yl-methyl)-4,5-dimethylthiazole-2-thione is dissolved in 100 parts by volume of water. To the solution there is slowly added 10.2 parts of 30% hydrogen peroxide under agitation while the temperature is kept at 20° C. The resulting mixture is agitated for 2 hours to allow a reaction to take place. 5.5 parts of sodium bicarbonate is added to reaction mixture to adjust the pH value to the neutral range, followed by adding to the so-treated total mixture a concentrated aqueous solution of 2.5 parts of ammonium thiocyanate to give 8.0 parts by weight of 3-(2-methyl-4-aminopyrimidin - 5 - yl - methyl) - 4,5 - dimethylthiazolium thiocyanate. (Yield 80%) M.P. 188–190° C.

*Elementary analysis.*—Calculated for $C_{12}H_{15}N_5S_2 \cdot H_2O$: C, 46.28; H, 5.50; N, 22.49. Found: C, 45.89; H, 5.36; N, 22.21.

In place of the above ammonium thiocyanate a concentrated aqueous solution of 2.5 parts by weight of sodium nitrate is employed to give 6.5 parts of 3-(2-methyl-4-aminopyrimidin-5-yl-methyl)-4,5-dimethylthiazolium nitrate. (Yield 68%.)

After recrystallizing from hot water, the nitrate is in the form of colorless needles melting at 185–188° C. (decomposition).

*Elementary analysis.*—Calculated for $C_{11}H_{15}N_5O_3S$: C, 44.43; H, 5.08; N, 23.55. Found: C, 44.26; H, 5.20; N, 23.35.

10 parts of 3-(2-methyl-4-aminopyrimidin-5-yl-methyl)-4,5-dimethylthiazole-2-thione is suspended in 40 parts by volume of water, followed by adding 9.2 parts by weight of dihydrate of barium chloride. To the suspension, there is slowly added 11.6 parts by volume of 30% hydrogen peroxide under agitation while the temperature is kept at 20° C. The resulting mixture is agitated for 3 hours to allow a reaction to take place. After the reaction, barium sulfate is filtered off. The filtrate is concentrated under reduced pressure and 100 parts by volume of ethanol added thereto, followed by cooling to give crystals. The crystals are collected and dried to give 9.4 parts of 3-(2-methyl-4-aminopyrimidin-5-yl-methyl)-4,5-dimethyl thiazolium chloride hydrochloride as colorless needles melting at 232° C. (decomposition). Yield 87%.

The other salts of this invention are prepared in analogous manner.

EXAMPLE 2

Formulations (A) The following components are admixed:

| | Parts |
|---|---|
| 3 - (2 - methyl - 4 - aminopyrimidin - 5 - yl -methyl)-4,5-dimethylthiazolium chloride hydrochloride | 0.3 |
| Terephthalic acid | 24.7 |
| Wheat flour | 75 |

1 part of the mixture is homogeneously added to 99 parts of conventional diet for chicks.

Thus-prepared composition is fed to chicks.

(B) The following components are admixed:

| | Parts |
|---|---|
| 3-(2 - methyl - 4 - aminopyrimidin - 5 - yl - methyl)-4,5-dimethyl-thiazolium chloride hydrochloride | 0.1 |
| Terephthalic acid | 9.9 |
| Soybean flour | 85 |
| Sucrose | 5 |

Two parts of the mixture are homogeneously added to 98 parts of conventional poultry diet for breeders.
Thus-prepared composition is fed to breeders.

(C) The following components are admixed:

| | Parts |
|---|---|
| 3-(2 - methyl - 4 - aminopyrimidin - 5 - yl - methyl)-4,5-dimethyl-thiazolium chloride hydrochloride | 0.2 |
| Terephthalic acid | 19.8 |
| Fermentation residue | 80 |

2 parts of the mixture is homogeneously added to 98 parts of conventional poultry diet for breeders.
Thus-prepared composition is fed to breeders.

(D) The following components are admixed:

| | Parts |
|---|---|
| 3 - (2 - methyl - 4 - aminopyrimidin - 5 - yl - methyl)-4,5-dimethyl-thiazolium chloride hydrochloride | 0.1 |
| Terephthalic acid | 5.9 |
| Lactose | 79 |
| Sucrose | 15 |

5 parts of the mixture is dissolved in 100 parts by volume of water.
Thus-prepared composition is fed to chicks.

(E) The following components are admixed:

| | Parts |
|---|---|
| 3-(2 - methyl - 4 - aminopyrimidin - 5 - yl - methyl)-4,5-dimethyl-thiazolium chloride hydrochloride | 0.01 |
| Terephthalic acid | 0.99 |
| Grain flour | 88 |
| Calcium carbonate | 11 |

50 parts of the mixture is homogeneously added to 50 parts of conventional poultry diet for layers.
Thus-prepared composition is fed to layers.

(F) The following components are admixed:

| | Parts |
|---|---|
| 3-(2 - methyl - 4 - aminopyrimidin - 5 - yl - methyl)-4,5-dimethyl-thiazolium thiocyanate | 0.3 |
| Terephthalic acid | 24.7 |
| Wheat flour | 75 |

One part of the mixture is homogeneously added to 99 parts of conventional diet for chicks.
Thus-prepared composition is fed to chicks.

(G) The following components are admixed:

| | Parts |
|---|---|
| 3 - (2 - methyl - 4 - aminopyrimidin - 5 - yl - methyl)-4,5-dimethyl-thiazolium nitrate | 0.1 |
| Terephthalic acid | 9.9 |
| Soybean flour | 85 |
| Sucrose | 5 |

Two parts of the mixture is homogeneously added to 98 parts of conventional poultry diet for breeders.
Thus-prepared composition is fed to breeders.

(H) The following components are admixed:

| | Parts |
|---|---|
| 3-(2 - methyl - 4 - aminopyrimidin - 5 - yl - methyl)-4,5-dimethyl-thiazolium thiocyanate | 0.2 |
| Terephthalic acid | 19.8 |
| Fermentation residue | 80 |

Two parts of the mixture is homogeneously added to 98 parts of conventional poultry diet for breeders.
Thus-prepared composition is fed to breeders.

(I) The following components are admixed:

| | Parts |
|---|---|
| 3 - (2 - methyl - 4 - aminopyrimidin - 5 - yl - methyl)-4,5-dimethyl-thiazolium nitrate | 0.1 |
| Terephthalic acid | 5.9 |
| Lactose | 30 |
| Sucrose | 64 |

Five parts of the mixture is dissolved in 100 parts by volume of water.

Thus-prepared composition is fed to chicks.

(J) The following components are admixed:

| | Parts |
|---|---|
| 3 - (2 - methyl - 4 - aminopyrimidin - 5 - yl-methyl)-4,5-dimethyl thiazolium nitrate | 0.01 |
| Terephthalic acid | 0.99 |
| Wheat flour | 88 |
| Calcium carbonate | 11 |

25 parts of the mixture is homogeneously added to 75 parts of conventional poultry diet for layers.

Thus-prepared composition is fed to layers.

(K) The following components are admixed:

| | Parts |
|---|---|
| 3 - (2 - methyl - 4 - aminopyrimidin - 5 - yl-methyl)-4,5-dimethyl-thiazolium mononitrate | 0.3 |
| Terephthalic acid | 24.7 |
| Wheat flour | 75 |

1 part of the mixture is homogeneously added to 99 parts of conventional diet for chicks.

Thus-prepared composition is fed to chicks.

Feeding poultry with any of the above-described compositions is effective in preventing and/or in alleviating coccidiosis.

Although the present invention has been described in conjunction with presently preferred embodiments, essentially the same procedures can be followed with any of the hereindescribed compositions, with essentially similar results.

If the effective amount, i.e. the anti-coccidial amount, of the thiazolium salt to be administered according to the present invention is calculated in terms of the amount per 100 grams of the body weight of poultry, it may also be expressed as about 0.3 to 20 milligrams, preferably about 1 to 10 milligrams, per 100 grams of the body weight of poultry, and amount of terephthalic acid may be preferably expressed as about 30 to about 170 milligrams, preferably about 60 to 100 milligrams, per 100 grams of the body weight of poultry.

What is claimed is:

1. A method of treating or preventing coccidiosis in poultry which comprises administering to the poultry an anti-coccidial amount of an admixture of (a) thiazolium salt of the formula

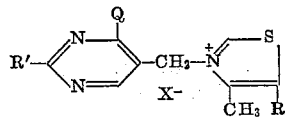

wherein each of R and R' is alkyl with a maximum of 3 carbon atoms, Q is a member of —NH₂ and NH₃⁺X'⁻, each of X⁻ and X'⁻ is an inorganic acid ion, and (b) a member selected from the group consisting of free terephthalic acid, terephthalic acid mono- and di-alkyl esters with a maximum of 4 carbon atoms in an alkyl group and pharmaceutically acceptable salts of said acid and mono-esters, and (c) an ingestible pharmaceutical carrier (a) and (b), the concentration of component (a) in the total composition being from about 0.001% to about 0.05% by weight and the concentration of component (b) in the total composition being from about 0.1% to about 0.5% by weight.

2. A method according to claim 1 wherein the pharmaceutically acceptable salts are sodium or potassium salts.

3. A method according to claim 1 wherein X⁻ and X'⁻ are independently selected from the group consisting of anions Cl⁻, Br⁻, I⁻, NO₃⁻, NO₂⁻, (SO₄⁻⁻)½, ClO₄⁻ and SCN⁻.

4. A method according to claim 1 wherein X⁻ and X'⁻ are independently selected from the group consisting of anions Cl⁻, Br⁻, I⁻, NO₃⁻, NO₂⁻, (SO₄⁻⁻)½, ClO₄⁻ and SCN⁻, and the pharmaceutically acceptable salts are sodium or potassium salts.

5. The method according to claim 1, wherein (a) is 3 - (2 - methyl - 4 - aminopyrimidin - 5 - yl - methyl)-4,5-dimethylthiazolium choride hydrochloride and (b) terephthalic acid.

6. The method according to claim 1, wherein (a) is 3 - (2 - methyl - 4 - amino - pyrimidin - 5 - yl - methyl)-4,5-dimethylthiazolium nitrate and (b) terephthalic acid.

7. The method according to claim 1, wherein (a) is 3 - (2 - methyl - 4 - amino - pyrimidin - 5 - yl - methyl)-4,5-dimethylthiazolium thiocyanate and (b) is terephthalic acid.

8. The method according to claim 1, wherein (a) is 3 - (2 - ethyl - 4 - amino - pyrimidin - 5 - yl - methyl)-4,5-dimethylthiazolium nitrate and (b) is terephthalic acid.

9. A composition for the treatment or prevention of coccidiosis in poultry which comprises an ingestible pharmaceutical carrier and as its active ingredients, (a) thiazolium salt of the formula

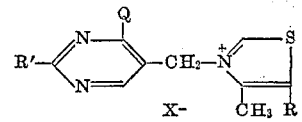

wherein each of R and R' is alkyl with a maximum of 3 carbon atoms, Q is a member of —NH₂ and —NH₃X'⁻, each of X⁻ and X'⁻ is an inorganic acid anion, and (b) a member selected from the group of free terephthalic acid, terephthalic acid mono- and di-alkyl esters with a maximum of 4 carbon atoms in an alkyl group and pharmaceutically acceptable salts of said acid and mono-esters, the concentration of said active ingredient (a) in the total composition being from 0.001% to about 0.05% by weight and the concentration of said active ingredient (b) in the total composition being from about 0.01% to about 0.5% by weight.

10. A composition according to claim 9 wherein the pharmaceutically acceptable salts are sodium or potassium salts.

11. A composition according to claim 9 wherein X⁻ and X'⁻ are independently selected from the group consisting of anions Cl⁻, Br⁻, I⁻, NO₃⁻, NO₂⁻, (SO₄⁻⁻)½, ClO₄⁻ and SCN⁻.

12. A composition according to claim 9 wherein X⁻ and X'⁻ are independently selected from the group consisting of anions Cl⁻, Br⁻, I⁻, NO₃⁻, NO₂⁻, (SO₄⁻⁻)½, ClO₄⁻ and SCN⁻, and the pharmaceutically acceptable salts are sodium or potassium salts.

13. A composition according to claim 9, wherein (a) is 3 - (2 - methyl - 4 - aminopyrimidin - 5 - yl - methyl)-4,5-dimethylthiazolium chloride hydrochloride and (b) is terephthalic acid.

14. A composition according to claim 9, wherein (a) is 3 - (2 - methyl - 4 - aminopyrimidin - 5 - yl - methyl)-4,5-dimethylthiazolium nitrate and (b) is terephthalic acid.

15. A composition according to claim 9, wherein (a) is 3 - (2 - methyl - 4 - aminopyrimidin - 5 - yl - methyl)-4,5-dimethylthiazolium thiocyanate and (b) is terephthalic acid.

16. A composition according to claim 9, wherein (a) is 3 - (2 - ethyl - 4 - aminopyrimidin - 5 - yl - methyl)-4,5-dimethylthiazolium nitrate and (b) is terephthalic acid.

17. A composition according to claim 9, wherein the carrier or diluent is essentially constituted by poultry feed.

18. A composition according to claim 9, wherein the carrier or diluent is essentially constituted by drinking water for the poultry.

References Cited

UNITED STATES PATENTS

| | | | |
|---|---|---|---|
| 2,855,340 | 9/1958 | Kent et al. | 167—53 |
| 3,268,403 | 8/1966 | Rogers et al. | 167—53.1 |
| 3,304,227 | 2/1967 | Loveless | 167—53.1 |

OTHER REFERENCES

Veterinary Bulletin, No. 4138, 1961.
Veterinary Bulletin, No. 83, 1960.

HOWARD M. ELLIS, Primary Examiner
FRANK CACCIAPAGLIA, JR., Assistant Examiner

U.S. Cl. X.R.

424—308, 317